US012472515B2

(12) United States Patent
Yamauchi

(10) Patent No.: US 12,472,515 B2
(45) Date of Patent: Nov. 18, 2025

(54) ELECTROSTATIC COATING DEVICE

(71) Applicant: ABB Schweiz AG, Baden (CH)

(72) Inventor: Kuniharu Yamauchi, Tokyo (JP)

(73) Assignee: ABB Schweiz AG, Baden (CH)

( * ) Notice: Subject to any disclaimer, the term of this patent is extended or adjusted under 35 U.S.C. 154(b) by 446 days.

(21) Appl. No.: 17/804,301

(22) Filed: May 26, 2022

(65) Prior Publication Data

US 2022/0410189 A1 Dec. 29, 2022

(30) Foreign Application Priority Data

Jun. 23, 2021 (JP) ................................. 2021-103758

(51) Int. Cl.
*B05B 5/04* (2006.01)

(52) U.S. Cl.
CPC .......... *B05B 5/0407* (2013.01); *B05B 5/0426* (2013.01)

(58) Field of Classification Search
CPC ..... B05B 5/0407; B05B 5/0426; B05B 5/043; B05B 15/55; B05B 1/306; B05B 12/149; B05B 15/18; B05B 5/0415; B05B 13/0431; B05B 5/08; B05B 5/10
USPC ............................. 239/700, 1, 507, 504, 510
See application file for complete search history.

(56) References Cited

U.S. PATENT DOCUMENTS 5,353,995 A * 10/1994 Chabert .................... B05B 5/04 239/701
5,397,063 A * 3/1995 Weinstein ............... B05B 5/053 239/700
5,697,559 A 12/1997 Davis et al.
5,775,598 A * 7/1998 Takayama ............. B05B 5/0533 239/707
5,788,164 A * 8/1998 Tomita .................. B05B 5/0415 239/293
5,820,036 A * 10/1998 Saito ..................... B05B 3/1064 239/700

(Continued)

FOREIGN PATENT DOCUMENTS

JP H07251103 5 10/1995
JP H07251103 A 10/1995

(Continued)

OTHER PUBLICATIONS

Decision to Grant a Patent, issued by the Japanese Patent Office, regarding corresponding patent application Serial No. JP2021-103758; dated Sep. 6, 2021; 5 pages (with English translation).

(Continued)

*Primary Examiner* — Joseph A Greenlund
*Assistant Examiner* — Anna Thi Ho
(74) *Attorney, Agent, or Firm* — GREENBERG TRAURIG, LLP

(57) ABSTRACT

The durability of resin components can be improved by preventing ozone from staying in gaps where there is no air flow. A cylindrical gap is provided around the outer peripheral side of the head portion between the head portion and the resin cover portion covering the outer peripheral side of the head portion. Moreover, the head portion is provided with a pilot air introduction path guiding the pilot air exhausted from the switching valves to the cylindrical gap. In addition, the arm portion is provided with a pilot air exhaust path exhausting the pilot air from the cylindrical gap to the outside.

19 Claims, 4 Drawing Sheets

(56) References Cited

U.S. PATENT DOCUMENTS

| | | | | |
|---|---|---|---|---|
| 6,991,178 | B2 * | 1/2006 | Nolte | B05B 5/0407 239/296 |
| 7,036,750 | B2 * | 5/2006 | Krumma | B05B 3/10 239/296 |
| 7,051,950 | B2 * | 5/2006 | Giuliano | B05B 12/14 239/693 |
| 7,055,768 | B1 * | 6/2006 | Stratton | B05B 5/0418 239/700 |
| 8,141,797 | B2 * | 3/2012 | Vetter | B05B 3/1014 239/230 |
| 9,687,863 | B2 | 6/2017 | Tomohiro | |
| 9,901,942 | B2 * | 2/2018 | Nolte | B05B 5/005 |
| 11,389,811 | B2 * | 7/2022 | Kishimoto | B05B 15/55 |
| 2004/0159724 | A1 * | 8/2004 | van der Steur | B05B 5/0418 239/690 |
| 2005/0077384 | A1 * | 4/2005 | Tani | B05B 5/0426 239/296 |
| 2005/0092238 | A1 * | 5/2005 | Ueno | B05B 12/1463 118/621 |
| 2010/0012743 | A1 * | 1/2010 | Nakazono | B05B 5/1675 239/3 |
| 2010/0140375 | A1 * | 6/2010 | Kuroda | B05B 3/1064 239/214.11 |
| 2010/0282865 | A1 * | 11/2010 | Yamada | B05B 3/1042 239/289 |
| 2011/0014371 | A1 * | 1/2011 | Herre | B05B 12/149 901/50 |
| 2011/0271906 | A1 * | 11/2011 | Yamada | B05B 5/0426 118/621 |
| 2012/0031329 | A1 * | 2/2012 | Sakakibara | B05B 5/0426 118/626 |
| 2012/0111268 | A1 * | 5/2012 | Nakazono | B05B 5/0407 118/621 |
| 2013/0026258 | A1 * | 1/2013 | Motozaki | B05B 5/0403 239/700 |
| 2013/0040064 | A1 * | 2/2013 | Shigekura | B05B 5/0426 427/427.3 |
| 2015/0136022 | A1 * | 5/2015 | Yamada | B05B 5/057 118/626 |
| 2015/0360246 | A1 * | 12/2015 | Iwase | B05B 5/04 239/3 |
| 2020/0171517 | A1 * | 6/2020 | Ackerman | B05B 7/045 |
| 2020/0290063 | A1 * | 9/2020 | Manabe | B05B 1/14 |
| 2020/0316622 | A1 * | 10/2020 | Kishimoto | B05B 5/04 |

FOREIGN PATENT DOCUMENTS

| | | | | |
|---|---|---|---|---|
| JP | H08112559 6 | | 5/1996 | |
| JP | H08112559 | A | 5/1996 | |
| JP | H10305241 7 | | 11/1998 | |
| JP | H10305241 | A | 11/1998 | |
| JP | 2001137746 | A | 5/2001 | |
| JP | 2003117440 | A | 4/2003 | |
| JP | 2006167517 | A | 6/2006 | |
| JP | 4189106 | B2 | 12/2008 | |
| JP | 2009202055 | A | 9/2009 | |
| JP | 5642893 | B2 * | 12/2014 | B05B 3/1035 |
| WO | WO-9936184 | A1 * | 7/1999 | B05B 12/1472 |
| WO | 2015146970 8 | | 10/2015 | |
| WO | 2015146970 | A1 | 10/2015 | |
| WO | WO-2016163178 | A1 * | 10/2016 | B05B 15/55 |
| WO | WO-2017138531 | A1 * | 8/2017 | B05B 12/00 |
| WO | 2018154622 9 | | 8/2018 | |
| WO | 2018154622 | A1 | 8/2018 | |
| WO | 2018/181917 10 | | 10/2018 | |
| WO | 2018181917 | A1 | 10/2018 | |

OTHER PUBLICATIONS

Extended European Search Report, issued by the European Patent Office, regarding corresponding patent application Serial No. EP 22173048.4; dated Oct. 31, 2022; 8 pages.

* cited by examiner

ELECTROSTATIC COATING DEVICE

FIELD

The present disclosure relates to an electrostatic coating device which performs coating by directly applying a high voltage to paint.

BACKGROUND

Generally, a coating device coating coated objects such as automobile bodies includes: an arm portion with a base end side mounted to an operating device of an coating robot and the like; a head portion provided at the tip side of the arm portion; an air motor provided at the head portion and powered by compressed air; a hollow rotating shaft rotatably supported by the air motor and the tip of the hollow rotating shaft protrudes forward from the air motor; a feed tube extending through the inside of the rotating shaft to the tip of the rotating shaft for supplying paint; a rotary atomizing head mounted at the tip of the rotating shaft and spraying the paint supplied from the feed tube to the coated object; a valve device provided at the head portion and provided with a switching valve including a trigger valve for opening and closing the paint supply path to the feed tube by pilot air; and a cover portion formed as a resin cylindrical body covering the outer peripheral side of the head portion.

In addition, as a coating device for improving the coating efficiency of paint, electrostatic coating devices are known. The electrostatic coating device is provided with a high voltage generator at the arm portion, which applies a high voltage to the paint supplied to a rotary atomizing head through an air motor and a rotating shaft (Patent Literature 1).

CITATION LIST

Patent Literature

Patent Literature 1: International Publication No. 2018/181917

SUMMARY

Technical Problem

The electrostatic coating device of Patent Literature 1 causes a high voltage generated by a high voltage generator to electrically charge an air motor, a rotating shaft, and the like, applying the high voltage to paint supplied to a rotary atomizing head through a feed tube. Thereby, the electrostatic coating device causes the electrically charged paint particles sprayed from the rotary atomizing head to fly toward the grounded coated object.

In this case, ozone is released from the metal air motor and the rotating shaft which are electrically charged with high voltage. Ozone released from these components is exhausted together with compressed air (exhaust) which serves as the driving source of the air motor and shaping air which adjusts the spray pattern of the paint.

However, the electrostatic coating device has other metal components such as a valve device, and the ozone released from the valve device and the like will stay in the gap between the head portion and the cover portion and the gap between the arm portion and the head portion. In this way, the stayed ozone may gradually diffuse to other gaps and corrode resin components. Corroded components have to be replaced as they may also cause high voltage leaks, which reduces the durability of components.

Given the above-mentioned problems of prior art, the present disclosure has been made to provide an electrostatic coating device capable of improving the durability of resin components by preventing ozone from staying in gaps where there is no air flow.

Solution to Problem

The present disclosure is an electrostatic coating device including: an arm portion with a base end side mounted to an operating device; a head portion provided at the tip side of the arm portion; an air motor provided at the head portion and powered by compressed air, a hollow rotating shaft rotatably supported by the air motor and the tip of the hollow rotating shaft protrudes forward from the air motor; a feed tube extending through the inside of the rotating shaft to the tip of the rotating shaft for supplying paint; a rotary atomizing head mounted at the tip of the rotating shaft and spraying the paint supplied from the feed tube to the coated object; a valve device provided at the head portion and provided with a switching valve including a trigger valve for opening and closing the paint supply path to the feed tube by pilot air; a high voltage generator provided at the arm portion, which applies a high voltage to the paint supplied to the rotary atomizing head through the valve device, the air motor and the rotating shaft; and a cover portion formed as a resin cylindrical body covering the outer peripheral side of the head portion, and in the electrostatic coating device, a cylindrical gap is provided between the head portion and the cover portion, the cylindrical gap surrounding an outer peripheral side of the head portion, the head portion is provided with a pilot air introduction path guiding the pilot air exhausted from the switching valve to the cylindrical gap; the arm portion is provided with a pilot air exhaust path exhausting the pilot air from the cylindrical gap to the outside.

Advantageous Effects

According to the present disclosure, ozone can be prevented from staying in the gap where there is no air flow and the durability of resin components can be improved.

DETAILED DESCRIPTION OF EMBODIMENTS

Hereinafter, an electrostatic coating device according to an embodiment of the present disclosure will be described in detail below with reference to FIGS. 1 to 5.

Figure 1:
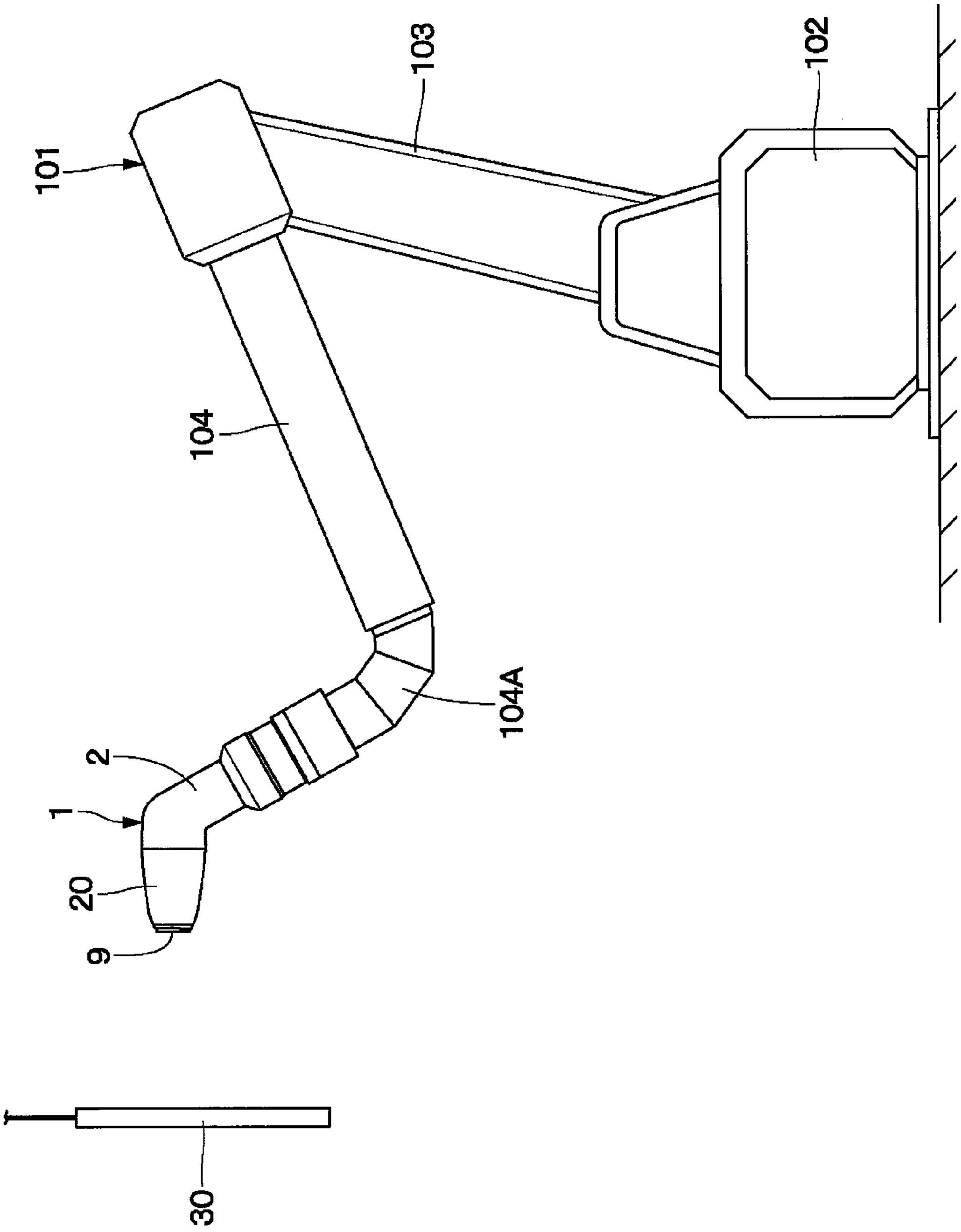
FIG. 1 is an overall configuration diagram showing a state in which an electrostatic coating device according to an embodiment of the present disclosure is mounted to a coating robot.

In FIG. 1, the coating robot 101 as a representative example of the operating device includes a base 102, a vertical arm 103 operably provided on the base 102 and a horizontal arm 104 as an arm portion rotatably provided at the tip of the vertical arm 103. The tip portion of the horizontal arm 104 is a rotatable wrist portion 104A. The arm portion 2 of the electrostatic coating device 1 described later is mounted to the wrist portion 104A.

Figure 2:
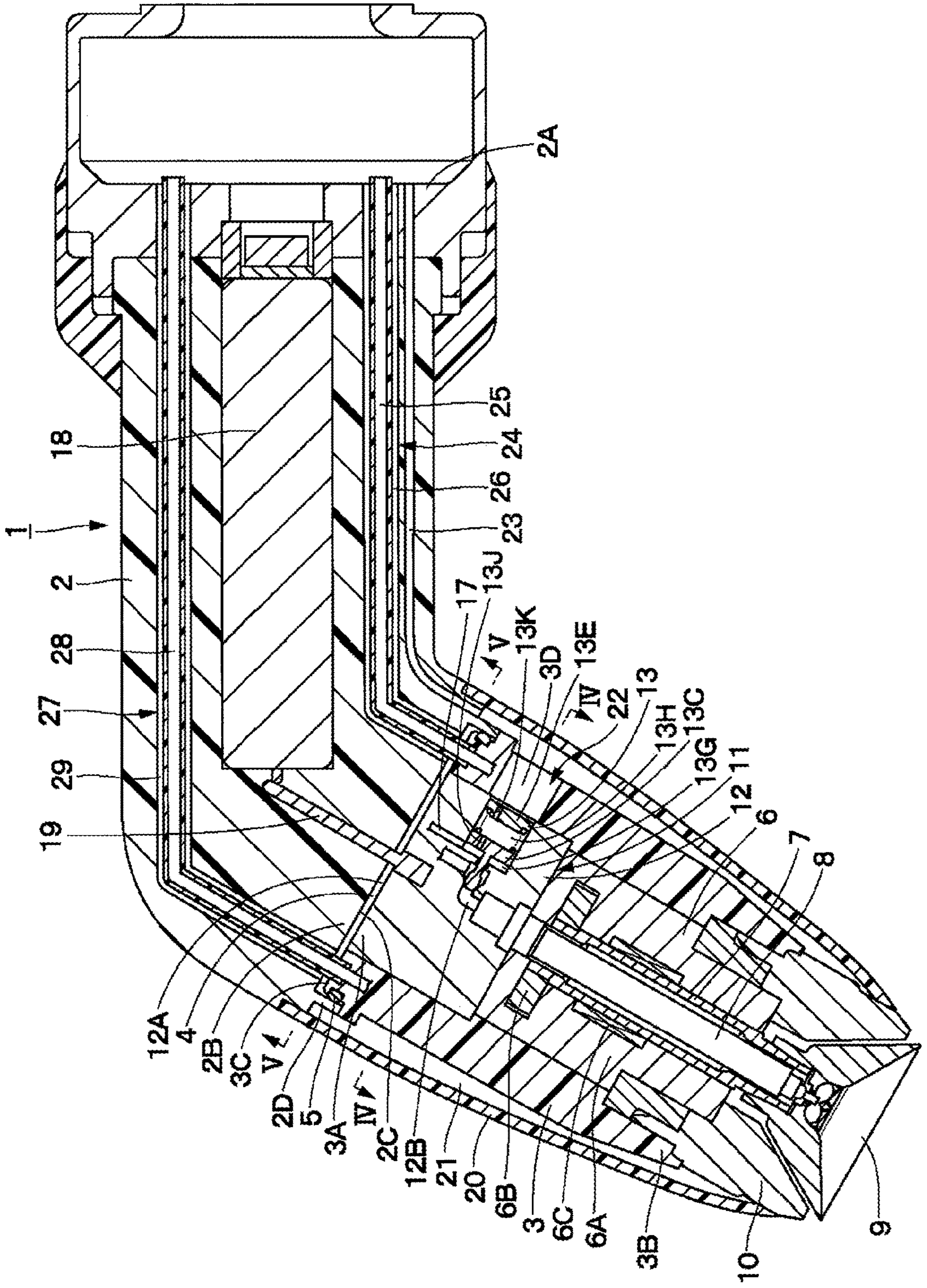
FIG. 2 is a sectional view showing the electrostatic coating device of FIG. 1.

Next, the configuration of the electrostatic coating device 1 according to the embodiment of the present disclosure will be described. The electrostatic coating device 1 is mounted to the wrist portion 104A of the horizontal arm 104 of the coating robot 101. As shown in FIG. 2, the electrostatic coating device 1 includes an arm portion 2, a head portion 3, an air motor 6, a rotating shaft 7, a feed tube 8, a rotary atomizing head 9, a valve device 11, a high voltage generator 18, a cover portion 20, a pilot air introduction path 22 and a pilot air exhaust path 23 described later.

In the arm portion 2, the base end portion 2A in the longitudinal direction as the base end side is mounted to the tip portion of the wrist portion 104A of the horizontal arm 104. The arm portion 2 is formed as a cylindrical body made of resin. In addition, the tip side of the arm portion 2 is bent obliquely. The tip portion 2B of the arm portion 2 has a tip surface 2C including a circular flat surface. The tip surface 2C faces the base end surface 3C of the head portion 3 described later and the base end surface 12A of the base member 12 constituting the valve device 11. Further, on the tip side of the arm portion 2, a shorty circular cylinder portion 2D is provided on the periphery of the tip surface 2C. A sealing member 5 described later is adhered to the inner peripheral surface of the cylinder portion 2D.

Provided in the arm portion 2 is a high voltage generator 18 described later extending in the axial direction. In addition, inside the arm portion 2, a pilot air exhaust path 23, a first dual pipeline 24, a second dual pipeline 27 and the like described later are provided at positions surrounding the high voltage generator 18.

The head portion 3 is provided on the tip side of the arm portion 2. The head portion 3 is formed as a resin cylindrical body with the base end portion 3A mounted to the tip portion 2B of the arm portion 2. A valve device 11 described later is provided on the base end portion 3A side of the head portion 3. In addition, an air motor 6, a shaping air ring 10 and the like described later are provided on the tip portion 3B side within the head portion 3.

Figure 4:
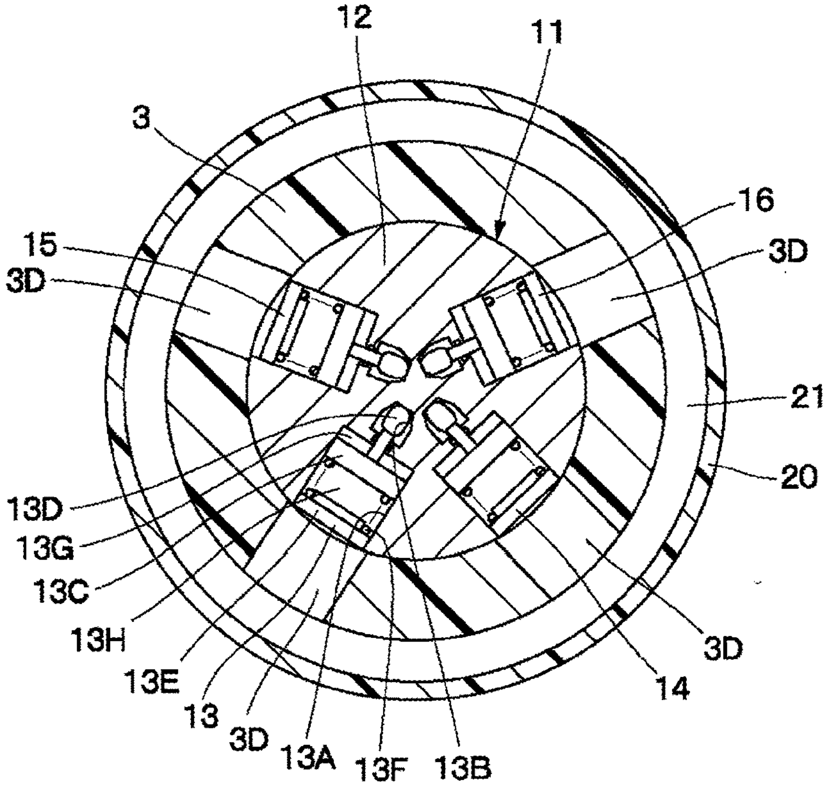
FIG. 4 is a sectional view of the electrostatic coating device viewed in the IV-IV direction shown by arrow in FIG. 2.

The base end face 3C of the head portion 3 faces the tip surface 2C of the arm portion 2 with a planar gap 4 described later sandwiched therebetween. On the base end side of the head portion 3, a valve mounting hole 3D is provided on the outer peripheral side of the valve device 11. As shown in FIG. 4, the valve mounting hole 3D passes through the head portion 3 in the radial direction. Further, a plurality of valve mounting holes 3D are provided at intervals in the circumferential direction, for example, four valve mounting holes 3D are provided corresponding to the switching valves 13 to 16 of the valve device 11.

Figure 5:
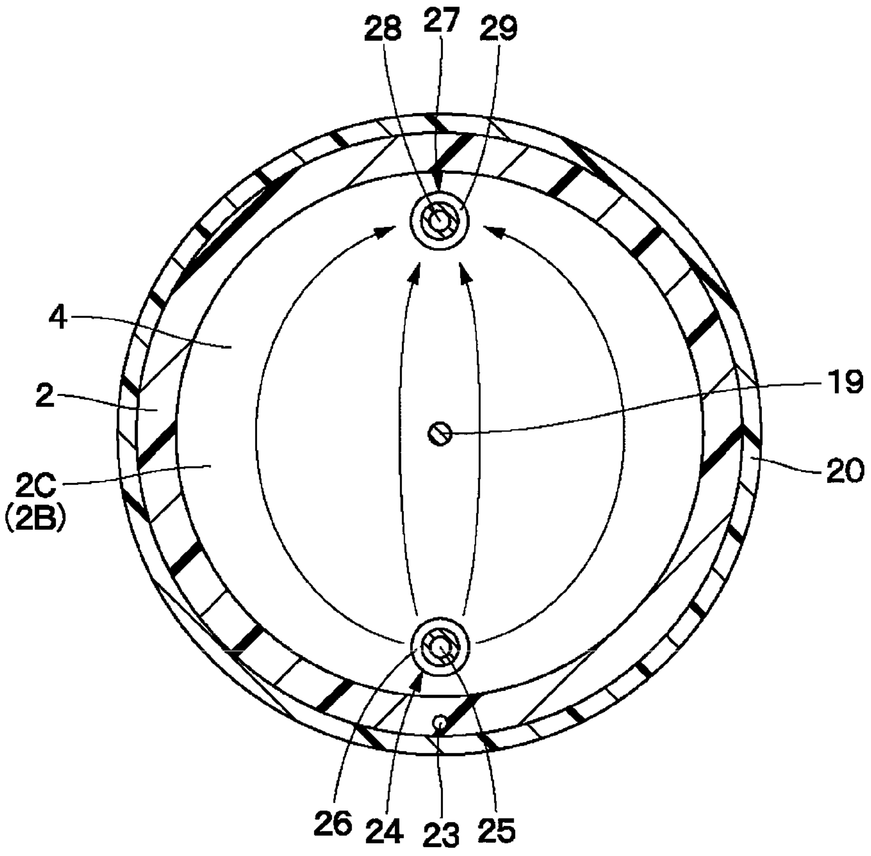
FIG. 5 is a sectional view of the electrostatic coating device viewed in the V-V direction shown by arrow in FIG. 2.

Here, the planar gap 4 is provided between the tip portion 2B of the arm portion 2 and the base end portion 3A of the head portion 3. Specifically, a majority of the planar gap 4 is disposed between the tip surface 2C of the arm portion 2 and the base end surface 3C of the head portion 3, and between the tip surface 2C and the base end surface 12A of the base member 12. In addition, as shown in FIG. 5, the planar gap 4 is formed in a circular shape. On this basis, a part of the outer peripheral side of the planar gap 4 extends along the cylinder portion 2D of the arm portion 2 to the tip side. Further, the planar gap 4 is actually a small gap, e.g., 1 mm or less, although it is illustrated as a large gap, and there may be a portion where the arm portion 2 and the head portion 3 contacts each other partially.

The sealing member 5 is provided on the outer peripheral side of the base end portion 3A of the head portion 3. The sealing member 5 includes a resin O-ring or the like and seals the planar gap 4 by adhering to the inner peripheral surface of the cylinder portion 2D of the arm portion 2. Thereby, the tip portion 2B of the arm portion 2 and the base end portion 3A of the head portion 3 are mounted facing each other with the sealing member 5 sandwiched therebetween in the periphery.

The air motor 6 is arranged coaxially with the head portion 3 within the head portion 3. The air motor 6 uses compressed air as the power source to rotate the rotating shaft 7 and the rotary atomizing head 9 at a high speed of, for example, 3,000 rpm to 150,000 rpm. The air motor 6 includes a stepped cylindrical motor cases 6A mounted in the head portion 3, a turbine 6B rotatably accommodated on the base end side of the motor case 6A, and an air bearing 6C provided on the inner peripheral side of the motor case 6A and rotatably supporting the rotation shaft 7.

Here, compressed air for driving is supplied to the turbine 6B via a compressed air supply path (not shown). In addition, the compressed air flowing out of the turbine 6B is exhausted to the outside via the compressed air exhaust path 25 of the first dual pipeline 24 and the compressed air exhaust path 28 of the second dual pipeline 27 described later.

The rotating shaft 7 is formed as a cylindrical body which is rotatably supported on the air motor 6 by the air bearing 6C. The rotating shaft 7 is arranged to extend axially to the center of the motor case 6A. The base end side of the rotating shaft 7 is integrally mounted at the center of the turbine 6B. On the other hand, the tip of the rotating shaft 7 protrudes from the motor case 6A to the front side (tip side). The rotary atomizing head 9 is mounted to the tip portion of the rotating shaft 7.

The feed tube 8 extends through the inside of the rotating shaft 7 to the tip of the rotating shaft 7. The tip side of the feed tube 8 protrudes from the tip of the rotating shaft 7 and extends into the rotary atomizing head 9. The base end side of the feed tube 8 is mounted at the center position of the base member 12 of the valve device 11. In the feed tube 8, an internal paint passage (not shown) is connected to a paint supply source (not shown) including a color change valve device via a paint supply path 12B described later. Further, the base end side of the feed tube 8 may be mounted to the head by extending the head portion to a position facing the base end side of the motor case 6A.

When performing the coating operation, the feed tube 8 supplies the paint from the paint passage toward the rotary atomizing head 9. On the other hand, when performing cleaning operation of adhered paint, the feed tube 8 can supply cleaning fluids such as thinner, air or the like from the paint passage toward the rotary atomizing head 9. For example, the feed tube 8 is a double pipe formed by two coaxially arranged pipes. Further, the central passage of the double pipe is the paint passage, and the outer annular passage is the cleaning fluid passage (not shown).

The rotary atomizing head 9 is mounted to the tip of the rotating shaft 7. The rotary atomizing head 9 is formed in a cup shape with a diameter extending from the base end side toward the tip side. The rotary atomizing head 9 rotates at a high speed together with the rotating shaft 7 by the air motor 6. Thereby, the rotary atomizing head 9 sprays the paint and the like supplied from the feed tube 8.

The shaping air ring 10 surrounding the rotary atomizing head 9, is provided on the tip portion 3B side of the head portion 3. The shaping air ring 10 ejects shaping air from a plurality of shaping air ejection holes (not shown). The shaping air adjusts the coating pattern of the paint to a desired size and shape while atomizing the paint sprayed from the rotary atomizing head 9.

The valve device 11 is provided on the base end portion 3A side in the head portion 3. As shown in FIG. 4, the valve device 11 includes a base member 12 and four switching valves 13 to 16 described later. The valve device 11 controls the operations of supplying, stopping and exhausting and the like of various fluids.

The base member 12 constitutes the base of the valve device 11 and is formed as a metal block body. The base member 12 is mounted to the base end side in the head portion 3. The base member 12 has a base end surface 12A facing the tip surface 2C of the arm portion 2. For example, the base member 12 is provided with: a paint supply path 12B, which forms a part of the paint supply path to the feed tube 8; a cleaning fluid passage through which cleaning fluid for cleaning the rotary atomizing head 9 circulates toward the feed tube 8; a dump passage through which the previous color paint and the cleaning fluid circulate when exhausting the previous color paint remaining in the paint supply path 12B; and a tip cleaning passage (none is shown) through which cleaning fluid for cleaning the paint adhered to the tip of the feed tube 8 circulates.

In addition, the base member 12 is further provided with a pilot air passage 17 (shown only for the switching valve 13) through which pilot air for operating the switching valves 13 to 16 circulates toward the switching valves 13 to 16.

Four switching valves 13 to 16 are provided on the base member 12. The four switching valves 13 to 16 are similarly configured. Therefore, the configuration of the switching valve 13 will be described and the description of the other switching valves 14 to 16 will be omitted. In addition, 1 to 3 or 5 or more switching valves may be provided.

Figure 3:
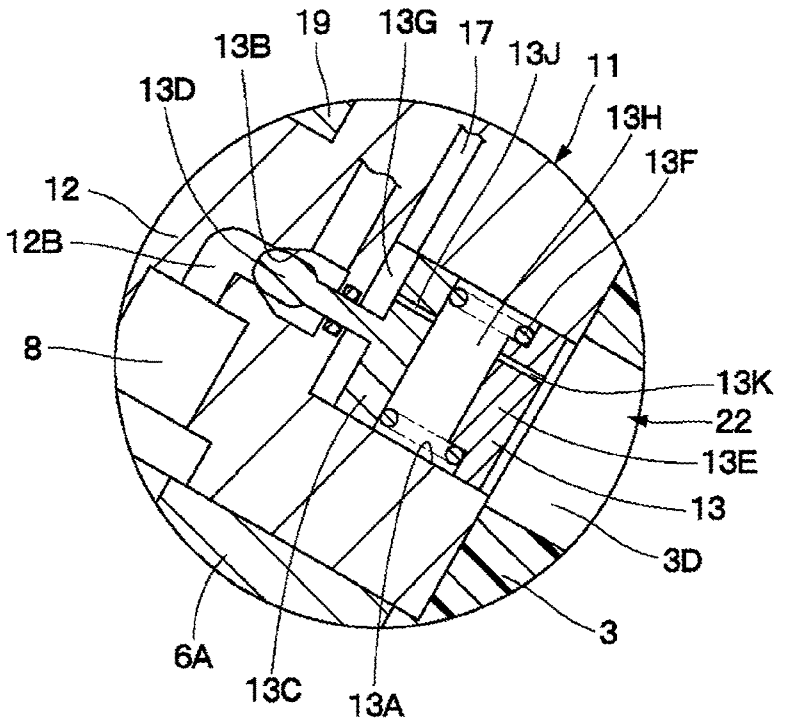
FIG. 3 is an enlarged sectional view of the trigger valve of FIG. 2.

As shown in FIG. 3, the switching valve 13 is formed as a trigger valve that opens and closes the paint supply path 12B by pilot air. The switching valve 13 includes: a bottomed valve accommodating hole 13A formed in the base member 12; a valve seat 13B extending from the bottom of the valve accommodating hole 13A toward the center side of the base member 12 and dividing the paint supply path 12B; a piston 13C movably accommodated in the valve accommodating hole 13A; a valve body 13D protruding from the piston 13C toward the valve seat 13B and seated on and/or unseated from the valve seat 13B; a cover body 13E closing the opening side of the valve accommodating hole 13A; and a spring member 13F disposed between the piston 13C and the cover body 13E and applying force on the valve body 13D in the valve closing direction via the piston 13C.

The valve accommodating hole 13A is defined by the piston 13C as a pilot chamber 13G on the bottom side and a spring chamber 13H on the cover body 13E side. The pilot chamber 13G is connected to a pilot air supply source (not shown) via a pilot air passage 17.

The piston 13C is provided with a throttle passage 13J connecting the pilot chamber 13G and the spring chamber 13H. Compared with the supply amount of pilot air to the pilot chamber 13G, only a small amount of air circulates through the throttle passage 13J.

Therefore, when pilot air is supplied to the pilot chamber 13G, the piston 13C moves in the valve opening direction against the spring member 13F. On the other hand, upon the supply of pilot air to the pilot chamber 13G being stopped, the pilot air of the pilot chamber 13G flows out to the spring chamber 13H side through the throttle passage 13J. Thereby, the piston 13C moves in the valve closing direction by the applied force of the spring member 13F.

The cover body 13E is provided with a gas exhaust passage 13K connecting the spring chamber 13H and the valve mounting hole 3D of the head portion 3. Thereby, the pilot air flowed into the spring chamber 13H flows out to the valve mounting hole 3D of the head portion 3 through the gas exhaust passage 13K. Moreover, the gas exhaust passage 13K together with the valve mounting hole 3D constitute a pilot air exhaust path 23 described later.

Here, the switching valve 13 is arranged such that the operation direction of the valve body 13D is the radial direction of the head portion 3. The switching valves 14 to 16 are also arranged in the same manner as the switching valve 13. Moreover, switching valves 13 to 16 are arranged at intervals in the circumferential direction of the head portion 3. In the present embodiment, the radial direction of the head portion 3 is orthogonal to the axis of the head portion 3 and is the elongation direction of a straight line passing through the center of the head portion 3 (base member 12) or the vicinity of the center of the head portion 3.

Further, the switching valves 14 to 16 are formed as a cleaning fluid valve for opening and closing the above-mentioned cleaning fluid passage, a dump valve for opening and closing the dump passage, and a tip cleaning valve for opening and closing the tip cleaning passages.

The high voltage generator 18 is provided in the arm portion 2. The high voltage generator 18 applies a high voltage to the paint supplied to the rotary atomizing head 9 through the valve device 11, the air motor 6 and the rotating shaft 7. The high voltage generator 18 includes for example a Cockcroft-Walton circuit. The high voltage generator 18 boosts the voltage supplied from a power supply device (not shown) to, for example, −60 kV to −120 kV. The output side of the high voltage generator 18 is electrically connected to a contact member 19 extending from the arm portion 2 to the base member 12.

The cover portion 20 is formed as a resin cylindrical body covering the outer peripheral side of the head portion 3. The base end side of the cover portion 20 is mounted to the outer periphery of the tip portion 2B of the arm portion 2. In addition, the tip side of the cover portion 20 is mounted to the outer periphery of the shaping air ring 10.

A cylindrical gap 21 is provided between the head portion 3 and the cover portion 20. The cylindrical gap 21 is formed as a cylindrical space extending around the outer peripheral side of the head portion 3. Here, the cylindrical gap 21 is a space isolated from the circulation path of the air exhausted from the air motor 6 and the path of the shaping air ejected from the shaping air ring 10.

Thus, ozone may stay in the cylindrical gap 21, and in this case, the outer peripheral surface of the head portion 3, the inner peripheral surface of the cover portion 20 and the like in contact with the cylindrical gap 21 may be corroded by ozone. Therefore, the head portion 3 is provided with a pilot air introduction path 22 and a pilot air exhaust path 23 described later so as to exhaust ozone from the cylindrical gap 21.

Next, configurations of the pilot air introduction path 22 and the pilot air exhaust path 23 that are characteristic parts of the present embodiment will be described.

The pilot air introduction path 22 is provided in the head portion 3. The pilot air introduction path 22 is a passage that guides the pilot air exhausted from the switching valves 13 to 16 to the cylindrical gap 21. The pilot air introduction path 22 includes exhaust passages 13K provided in the switching valves 13 to 16 (the exhaust passages of the switching valves 14 to 16 are not shown) and a valve mounting hole 3D of the head portion 3. That is to say, in the present embodiment, four pilot air introduction paths 22 are provided over the valve device 11 and the head portion 3. Therefore, the pilot air exhausted from the four switching valves 13 to 16 is supplied to the cylindrical gap 21 through the four pilot air introduction paths 22. Thereby, the four pilot air introduction paths 22 can allow pilot air to flow into the cylindrical gap 21 over a wide range.

The pilot air exhaust path 23 is provided in the arm portion 2. The pilot air exhaust path 23 is a passage exhausting the pilot air guided to the cylindrical gap 21 from the cylindrical gap 21 to the outside. The pilot air exhaust path 23 extends from the tip portion 2B of the arm portion 2 to the base end portion 2A. Moreover, the pilot air exhaust path 23 is opened to the outside of the arm portion 2 at the base end portion 2A of the arm portion 2. Thereby, the pilot air exhausted from the pilot air exhaust path 23 does not affect the sprayed paint.

Specifically, one end of the pilot air exhaust path 23 in the longitudinal direction is opened at the tip portion 2B of the arm portion 2 and is in connection with the cylindrical gap 21. On the other hand, the other end of the pilot air exhaust path 23 in the longitudinal direction is opened at the base end portion 2A of the arm portion 2 and opens up to the outside.

Here, the air flow generated by the pilot air introduction path 22 and the pilot air exhaust path 23 is described using reference numerals assigned to the switching valve 13.

When pilot air is supplied to any one of the four switching valves 13 to 16, a part of the supplied pilot air flows from the pilot chamber 13G to the spring chamber 13H via the throttle passage 13J. The pilot air flowed into the spring chamber 13H flows out to the valve mounting hole 3D of the head portion 3 through the gas exhaust passage 13K. As a result, the pilot air introduction path 22 including the gas exhaust passage 13K and the valve mounting hole 3D can guide the pilot air to the cylindrical gap 21.

On the other hand, the pilot air exhaust path 23 can exhaust the pilot air flowing through the cylindrical gap 21 from the base end portion 2A of the arm portion 2 to the outside.

In this manner, supply of pilot air to the cylindrical gap 21 through the pilot air introduction path 22 and exhaust of pilot air exhausted from the cylindrical gap 21 through the pilot air exhaust path 23 generate air flows in the cylindrical gap 21. The air flow also propagates to the tip side of the cylindrical gap 21. Thereby, the pilot air introduction path 22 and the pilot air exhaust path 23 can generate an air flow in the cylindrical gap 21 using the pilot and exhaust the ozone in the cylindrical gap 21 together with the air.

Next, a structure configured to exhaust the ozone remaining in the planar gap 4 to the outside will be described.

A first dual pipeline 24 is provided in the arm portion 2. The first dual pipeline 24 extends between the base end portion 2A of the arm portion 2 and the planar gap 4. The first dual pipeline 24 is formed as a pipe member having a dual structure with an inner passage and an outer passage.

The inner passage of the first dual pipeline 24 is a compressed air exhaust path 25 as a compressed air flow path through which compressed air (turbine air) exhausted from the turbine 6B of the air motor 6 circulates. The upstream side of the compressed air exhaust path 25 is connected to the air motor 6. The downstream side of the compressed air exhaust path 25 opens up to the outside at the base end portion 2A of the arm portion 2.

In addition, the outer passage of the first dual pipeline 24 is a purge air supply path 26 supplying purge air to the planar gap 4. The upstream side of the purge air supply path 26 is connected to the supply source (not shown) of purge air (compressed air). The downstream side of the purge air supply path 26 is connected to a position in the vicinity of the outer peripheral side of the planar gap 4.

A second dual pipeline 27 is provided in the arm portion 2. The second dual pipeline 27 extends between the base end portion 2A of the arm portion 2 and the planar gap 4 in the same manner as the first dual pipeline 24. The second dual pipeline 27 is formed as a pipe member having a dual structure with an inner passage and an outer passage.

The inner passage of the second dual pipeline 27 is a compressed air exhaust path 28 as a compressed air flow path through which compressed air exhausted from the turbine 6B of the air motor 6 circulates. The upstream side of the compressed air exhaust path 28 is connected to the air motor 6. The downstream side of the compressed air exhaust path 28 opens up to the outside at the base end portion 2A of the arm portion 2. Further, either of the inner passage of the first dual pipeline 24 and the inner passage of the second dual pipeline 27 may be used as the compressed air supply path through which compressed air circulates toward the turbine 6B.

In addition, the outer passage of the second dual pipeline 27 is a purge air exhaust path 29 exhausting purge air from the planar gap 4 to the outside. The upstream side of the purge air exhaust path 29 is connected to a position in the vicinity of the outer peripheral side of the planar gap 4. The downstream side of the purge air exhaust path 29 opens up to the outside at the base end portion 2A of the arm portion 2.

Here, the air flow generated by the purge air supply path 26 and the purge air exhaust path 29 will be described.

Upon purge air being supplied through the purge air supply path 26, the purge air flows into the planar gap 4. The purge air flowed into the planar gap 4 flows toward the purge air exhaust path 29 through the planar gap 4 and is exhausted to the outside through the purge air exhaust path 29. Thereby, ozone remaining in the planar gap 4 can be exhausted to the outside using the purge air.

Further, the purge air supply path 26 and the purge air exhaust path 29 are opened to the planar gap 4 at positions separated from each other. Thereby, as shown by arrows in FIG. 5, the purge air flowing into the planar gap 4 from the purge air supply path 26 can circulate throughout the planar gap 4 and ozone can be effectively exhausted.

The electrostatic coating device 1 according to the present embodiment has the configuration as described above. Next, the operation when coating on the coated object 30 by the electrostatic coating device 1 will be described.

Compressed air is supplied to the turbine 6B of the air motor 6 through the compressed air supply path, such that the rotating shaft 7 and the rotary atomizing head 9 rotate together with the turbine 6B at a high speed. In addition, the compressed air (used air) rotating the turbine 6B is exhausted to the outside through the compressed air exhaust paths 25 and 28.

In addition, a high voltage is applied from the high voltage generator 18 to the base member 12 of the valve device 11 via the contact member 19. Thereby, the high voltage is applied to the feed tube 8 via the base member 12, the motor case 6A of the air motor 6 and the rotating shaft 7.

In this state, pilot air is supplied from the pilot air passage 17 to the pilot chamber 13G of the switching valve 13, opening the valve body 13D. Thereby, the paint supplied from the paint supply source circulates in the paint supply path 12B of the base member 12 and the paint passage of the feed tube 8, and is sprayed from the rotary atomizing head 9 toward the coated object 30 (see FIG. 1).

When spraying paint, the paint flowing through the paint passage is electrically charged with high voltage by the high voltage applied to the feed tube 8. Thereby, the electrically charged paint particles sprayed from the rotary atomizing head 9 can be effectively coated to the coated object 30 having the ground potential. In addition, the shaping air ring 10 can adjust the spray pattern of the paint by spraying shaping air toward the sprayed paint.

When the switching valve 13 is opened by the pilot air, a part of the pilot air is guided to the cylindrical gap 21 through the pilot air introduction path 22 (the valve mounting hole 3D of the head portion 3 and the gas exhaust passage 13K of the switching valve 13). In addition, the pilot air guided to the cylindrical gap 21 is exhausted from the cylindrical gap 21 to the outside through the pilot air exhaust path 23.

The operation in which a part of the pilot air flows through the cylindrical gap 21 is similarly performed when the pilot air is supplied to the switching valves 14 to 16.

That is to say, the cleaning fluid valve is opened by pilot air after spraying paint. Thereby, the cleaning fluid is supplied to the rotary atomizing head 9 through the paint supply path 12B and the feed tube 8, cleaning the paint adhered to the paint supply path 12B, the feed tube 8 and the rotary atomizing head 9.

In addition, after cleaning the paint supply path 12B, the feed tube 8 and the rotary atomizing head 9, the dump valve is opened by pilot air. Thereby, waste liquid including paint remaining in the paint supply path 12B or the like and the cleaning fluid is exhausted.

In addition, the tip cleaning valve is opened by the pilot air after or in parallel with the exhaust of the waste liquid. Thereby, paint adhering to the tip of the feed tube 8 is cleaned.

Here, when the high voltage generated by the high voltage generator 18 via the contact member 19 is applied to the base member 12 or the like of the valve device 11, ozone is released from the metal base member 12 electrically charged with high voltage and the rotating shaft 7. The ozone released from the base member 12 and the rotating shaft 7 is exhausted together with the exhaust gas of compressed air having driven the turbine 6B of the air motor 6 and the shaping air sprayed from the shaping air ring 10.

However, in the electrostatic coating device 1, part of the ozone generated in the motor case 6A of the air motor 6, the base member 12 of the valve device 11 and the like flows into the cylindrical gap 21 between the head portion 3 and the cover portion 20 and the planar gap 4 between the tip surface 2C of the arm portion 2 and the base end face 3C of the head portion 3 and stays. In this way, the stayed ozone may corrode the arm portion 2, the head portion 3, the cover portion 20 and the like made of resin.

However, according to the present embodiment, a cylindrical gap 21 is provided around the outer peripheral side of the head portion 3 between the head portion 3 and the resin cover portion 20 covering the outer peripheral side of the head portion 3. Moreover, the head portion 3 is provided with a pilot air introduction path 22 guiding the pilot air exhausted from the switching valves 13 to 16 to the cylindrical gap 21. In addition, the arm portion 2 is provided with a pilot air exhaust path 23 exhausting the pilot air from the cylindrical gap 21 to the outside.

Accordingly, a part of the pilot air opening the switching valves 13 to 16 is guided to the cylindrical gap 21 through the pilot air introduction path 22, and is exhausted to the outside from the cylindrical gap 21 through the pilot air exhaust path 23.

The pilot air guided to the cylindrical gap 21 through the pilot air introduction path 22 flows through the cylindrical gap 21, thereby generating a flow in the ozone remaining in the cylindrical gap 21, and the ozone is exhausted to the outside from the pilot air exhaust path 23.

In addition, a part of the pilot air guided to the cylindrical gap 21 is exhausted to the outside from the pilot air exhaust path 23 immediately after being guided. However, the flow of pilot air from the pilot air exhaust path 23 toward the pilot air exhaust path 23 generates a flow in the cylindrical gap 21 due to pressure difference, such that ozone in the cylindrical gap 21 circulates toward the pilot air exhaust path 23.

As a result, ozone can be prevented from staying in the cylindrical gap 21 where there is no air flow and the durability of resin components such as the head portion 3 and the cover portion 20 can be improved.

In addition, the pilot air exhaust path 23 extends from the tip portion 2B of the arm portion 2 to the base end portion 2A and is opened to the outside of the arm portion 2 at the base end portion 2A of the arm portion 2. Thereby, the exhaust containing ozone can be prevented from interfering with the coating, thus the coating quality can be improved.

A plurality of switching valves 13 to 16 are provided at intervals in the circumferential direction of the head portion 3 such that the operation direction of the valve body 13D is the radial direction of the head portion 3. Thereby, it is possible to effectively exhaust the ozone remaining over a wide range by the pilot air exhausted from the plurality of switching valves 13 to 16.

On the other hand, in the electrostatic coating device 1 according to the present embodiment, the tip portion 2B of the arm portion 2 and the base end portion 3A of the head portion 3 are mounted facing each other with the sealing member 5 sandwiched therebetween in the periphery. Moreover, the arm portion 2 is provided with a purge air supply path 26 supplying purge air to the planar gap 4 between the tip portion 2B of the arm portion 2 and a base end portion 3A of the head portion 3, and a purge air exhaust path 29 exhausting the purge air from the planar gap 4 to the outside.

Therefore, purge air is regularly or always supplied to the planar gap 4 through the purge air supply path 26 and the purge air in the planar gap 4 is exhausted to the outside through the purge air exhaust path 29. Thereby, ozone can be prevented from staying in the planar gap 4 where there is no air flow and the durability of resin components such as the arm portion 2 and the sealing member 5 can be improved.

Moreover, the opening positions of the purge air supply path 26 and the purge air exhaust path 29 to the planar gap 4 are arranged on radially opposite sides of the furthest planar gap 4 where the opposite sides are most distant from each other. Thereby, the purge air supplied from the purge air supply path 26 can circulate over a wide range of the planar gap 4 and the exhaust efficiency of ozone can be improved.

In addition, the arm portion 2 is provided with a first dual pipeline 24 and a second dual pipeline 27 extending between the base end portion 2A of the arm portion 2 and the planar gap 4 and having an inner passage and an outer passage. Further, the inner passage of the first dual pipeline 24 and the inner passage of the second dual pipeline 27 are compressed air exhaust paths 25, 28 between which and the air motor 6 the compressed air circulates. In addition, the outer passage of the first dual pipeline 24 is the purge air supply path 26 and the outer passage of the second dual pipeline 27 is the purge air exhaust path 29. With this configuration, a plurality of air flow paths can be provided in a limited space.

REFERENCE SIGNS LIST

1 electrostatic coating device
2 arm portion
2A, 3A base end portion
2B tip portion
3 head portion
4 planar gap
5 sealing member
6 air motor
7 rotating shaft
8 feed tube
9 rotary atomizing head
11 valve device
13-16 switching valve
13E valve body
13K gas exhaust passage
18 high voltage generator
20 cover portion
21 cylindrical gap
22 pilot air introduction path
23 pilot air exhaust path
24 first dual pipeline
25, 28 compressed air exhaust path (inner passage, compressed air flow path)
26 purge air supply path (outer passage)
27 second dual pipeline
29 purge air exhaust path (outer passage)
101 coating robot (operating device)

What is claimed is:

1. An electrostatic coating device comprising:
an arm portion having a base end side mounted to an operating device;
a head portion provided at a tip side of the arm portion;
an air motor provided at the head portion and powered by compressed air, a hollow rotating shaft rotatably supported by the air motor and having a tip that protrudes forward from the air motor;
a feed tube extending through an inside of the hollow rotating shaft to the tip of the hollow rotating shaft for supplying paint;
a rotary atomizing head mounted at the tip of the hollow rotating shaft and configured to spray the paint supplied from the feed tube to a coated object;
a valve device provided at the head portion, the valve device comprising:
a switching valve including a trigger valve for opening and closing a paint supply path to the feed tube by pilot air, and
a base member mounted to an end of the head portion;
a contact member provided at the head portion, the contact member axially extending from the base member towards the arm portion;
a high voltage generator provided at the arm portion and in electrical connection with the contact member, the high voltage generator configured to apply a high voltage to the paint supplied to the rotary atomizing head through the contact member, the base member of the valve device, the air motor, the hollow rotating shaft, and through the feed tube; and
a cover portion formed as a resin cylindrical body covering an outer peripheral side of the head portion,
wherein the electrostatic coating device further comprises:
a cylindrical gap provided between the head portion and the cover portion, the cylindrical gap surrounding the outer peripheral side of the head portion,
a pilot air introduction path provided in the head portion, the pilot air introduction path guiding the pilot air exhausted from the switching valve to the cylindrical gap,
a pilot air exhaust path provided in the arm portion, the pilot air exhaust path exhausting the pilot air from the cylindrical gap to an outside of the electrostatic coating device, and
at least one compressed air exhaust path provided in the arm portion, the at least one compressed air exhaust path exhausting the compressed air from the air motor to the outside of the electrostatic coating device,
wherein the cylindrical gap is fluidly isolated from the at least one compressed air exhaust path.

2. The electrostatic coating device of claim 1, wherein the pilot air exhaust path extends from a tip portion of the arm portion to a base end portion of the arm portion, and is opened to the outside of the arm portion at the base end portion of the arm portion.

3. The electrostatic coating device of claim 1, wherein a plurality of switching valves are provided at intervals in a circumferential direction of the head portion such that an operation direction of a valve body is a radial direction of the head portion.

4. The electrostatic coating device of claim 1, wherein a tip portion of the arm portion and a base end portion of the head portion are mounted facing each other with a sealing member sandwiched therebetween in a periphery,
wherein the arm portion is provided with:
a purge air supply path supplying purge air to a planar gap between the tip portion of the arm portion and the base end portion of the head portion, and
a purge air exhaust path exhausting the purge air from the planar gap to the outside.

5. The electrostatic coating device of claim 4, wherein the at least one compressed air exhaust path provided in the arm portion comprises a first dual pipeline and a second dual pipeline extending between the base end portion of the arm portion and the planar gap, each of the first dual pipeline and the second dual pipeline having an inner passage and an outer passage,
wherein the inner passages of the first dual pipeline and the second dual pipeline form compressed air flow paths between the inner passages and the air motor to flow the compressed air,
wherein one of the outer passage of the first dual pipeline and the outer passage of the second dual pipeline is the purge air supply path, and
wherein another one of the outer passage of the first dual pipeline and the outer passage of the second dual pipeline is the purge air exhaust path.

6. The electrostatic coating device of claim 1, wherein a tip portion of the arm portion and a base end portion of the head portion are mounted facing each other with a sealing member sandwiched therebetween in a periphery.

7. The electrostatic coating device of claim 6, wherein the arm portion is provided with:

a purge air supply path supplying purge air to a planar gap between the tip portion of the arm portion and the base end portion of the head portion, and a purge air exhaust path exhausting the purge air from the planar gap to the outside.

8. The electrostatic coating device of claim 7, wherein the at least one compressed air exhaust path provided in the arm portion comprises a first dual pipeline and a second dual pipeline extending between the base end portion of the arm portion and the planar gap, each of the first dual pipeline and the second dual pipeline having an inner passage and an outer passage, wherein the inner passages of the first dual pipeline and the second dual pipeline form compressed air flow paths between the inner passages and the air motor to flow the compressed air, wherein one of the outer passage of the first dual pipeline and the outer passage of the second dual pipeline is the purge air supply path, and wherein another one of the outer passage of the first dual pipeline and the outer passage of the second dual pipeline is the purge air exhaust path.

9. A device comprising:

an arm portion;

a head portion provided at a tip side of the arm portion;

an air motor provided at the head portion, a hollow rotating shaft rotatably supported by the air motor and having a tip protruding forward from the air motor;

a feed tube extending through an inside of the hollow rotating shaft to the tip of the hollow rotating shaft for supplying paint;

a valve device provided at the head portion and provided with a switching valve including a trigger valve for opening and closing a paint supply path to the feed tube by pilot air, the valve device comprising a base member;

a contact member provided at the head portion, the contact member axially extending from the base member towards the arm portion;

a high voltage generator provided at the arm portion and in electrical connection with the contact member, the high voltage generator configured to apply a high voltage to the paint supplied to the tip through the contact member, the base member of the valve device, the air motor, the hollow rotating shaft, and through the feed tube;

a cylindrical gap provided between the head portion and a cover portion, the cylindrical gap surrounding an outer peripheral side of the head portion;

a pilot air introduction path provided in the head portion, the pilot air introduction path guiding the pilot air exhausted from the switching valve to the cylindrical gap;

a pilot air exhaust path provided in the arm portion, the pilot air exhaust path exhausting the pilot air from the cylindrical gap to an outside of the device; and at least one compressed air exhaust path provided in the arm portion, the at least one compressed air exhaust path exhausting the compressed air from the air motor to the outside of the device, wherein the cylindrical gap is fluidly isolated from the at least one compressed air exhaust path.

10. The device of claim 9, further comprising:

a rotary atomizing head mounted at the tip of the hollow rotating shaft and configured to spray the paint supplied from the feed tube to a coated object, wherein the high voltage generator is configured to apply the high voltage to the paint supplied to the rotary atomizing head through the contact member, the base member of the valve device, the air motor, the hollow rotating shaft, and through the feed tube.

11. The device of claim 9, wherein the cover portion is formed as a resin cylindrical body covering the outer peripheral side of the head portion.

12. The device of claim 9, wherein the pilot air exhaust path extends from a tip portion of the arm portion to a base end portion of the arm portion, and is opened to the outside of the arm portion at the base end portion of the arm portion.

13. The device of claim 9, wherein a plurality of switching valves are provided at intervals in a circumferential direction of the head portion such that an operation direction of a valve body is a radial direction of the head portion.

14. The device of claim 9, wherein a tip portion of the arm portion and a base end portion of the head portion are mounted facing each other with a sealing member sandwiched therebetween in a periphery, wherein the arm portion is provided with:

a purge air supply path supplying purge air to a planar gap between the tip portion of the arm portion and the base end portion of the head portion, and a purge air exhaust path exhausting the purge air from the planar gap to the outside.

15. The device of claim 14, wherein the arm portion is provided with a first dual pipeline and a second dual pipeline extending between the base end portion of the arm portion and the planar gap, each of the first dual pipeline and the second dual pipeline having an inner passage and an outer passage, wherein the inner passages of the first dual pipeline and the second dual pipeline form compressed air flow paths between the inner passages and the air motor to flow the compressed air, wherein one of the outer passage of the first dual pipeline and the outer passage of the second dual pipeline is the purge air supply path, and wherein another one of the outer passage of the first dual pipeline and the outer passage of the second dual pipeline is the purge air exhaust path.

16. The device of claim 9, wherein a tip portion of the arm portion and a base end portion of the head portion are mounted facing each other with a sealing member sandwiched therebetween in a periphery.

17. The device of claim 16, wherein the arm portion is provided with:

a purge air supply path supplying purge air to a planar gap between the tip portion of the arm portion and the base end portion of the head portion, and a purge air exhaust path exhausting the purge air from the planar gap to the outside of the device.

18. The device of claim 17, wherein the at least one compressed air exhaust path provided in the arm portion comprises a first dual pipeline and a second dual pipeline extending between the base end portion of the arm portion and the planar gap, each of the first dual pipeline and the second dual pipeline having an inner passage and an outer passage, wherein the inner passages of the first dual pipeline and the second dual pipeline form compressed air flow paths between the inner passages and the air motor to flow the compressed air.

19. The device of claim 18, wherein one of the outer passage of the first dual pipeline and the outer passage of the second dual pipeline is the purge air supply path, and wherein another one of the outer passage of the first dual pipeline and the outer passage of the second dual pipeline is the purge air exhaust path.

* * * * *